May 18, 1954  E. M. GIBSON  2,678,778
DUCK DECOY ANCHOR
Filed Sept. 29, 1952
Fig. 1
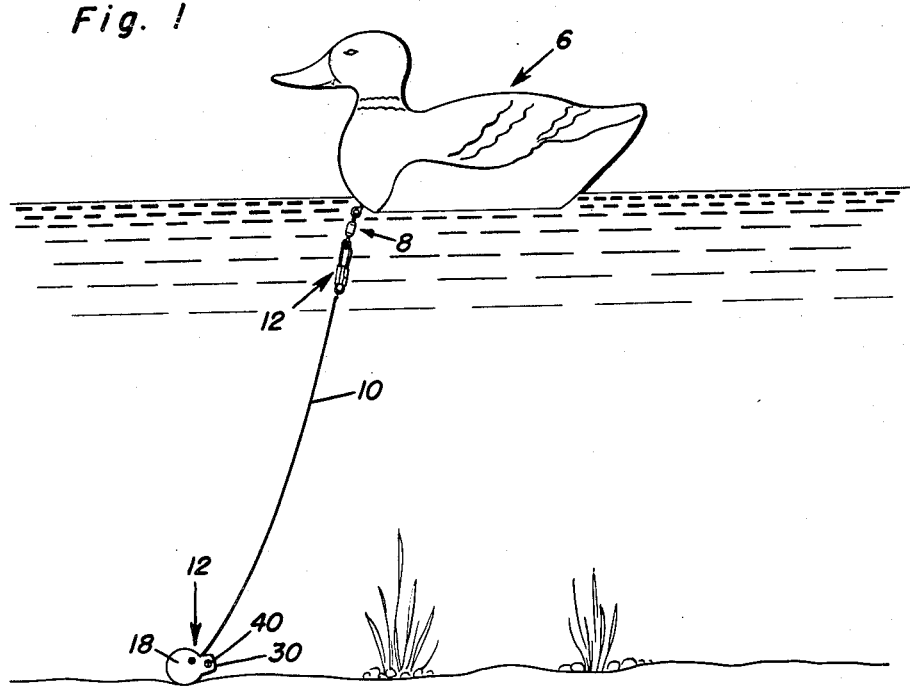
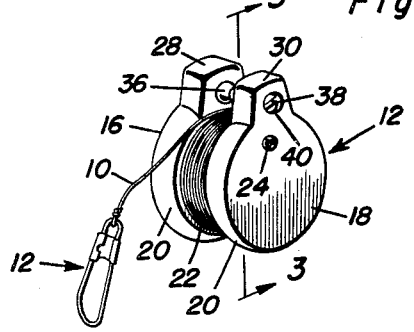
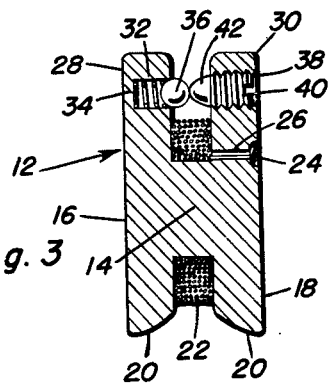
Fig. 4
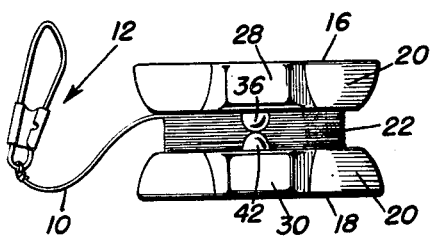
Estis M. Gibson
INVENTOR.
BY *Clarence A. O'Brien*
*and Harvey B. Jacobson*
Attorneys Patented May 18, 1954

2,678,778

UNITED STATES PATENT OFFICE 2,678,778

DUCK DECOY ANCHOR

Estis M. Gibson, Lebanon, Oreg.

Application September 29, 1952, Serial No. 312,117

2 Claims. (Cl. 242—96)

1

The present invention relates to improved ways and means whereby a decoy-duck may be moored to float on the surface of a body of water at a given spot and within the limits of a predetermined range of activity, and has more particular reference to a structurally and functionally novel anchor, as well as means for detachably connecting the anchor line with the decoy-duck.

One object of the invention has to do with a buoyant object, a decoy-duck for example, wherein the same is provided with a swivel, a catch detachably connected with the swivel, an anchoring line attached at one end to the catch, and a weighted anchor in the form of a reel, the other end of said line being wound on said reel, whereby, when the line is wound up it stays wound on the reel and the reel may be kept attached to the decoy-duck to avoid displacement or loss at a time when it is needed.

Another object of the invention has to do with the aforementioned combination wherein the reel is provided with detent means to keep said line from unwinding except when the line is under tension and so that it automatically unwinds as the reel descends into the water to come to rest on the bottom.

More specifically, the invention has to do with a decoy-duck mooring device comprising a weighted reel having a hub and heads at the ends of said hub, and line check means carried by said heads, said means embodying a spring pressed ball-type detent, and a setscrew opposite to and aligned with said detent.

More explicitly, the preferred form of the anchor is a weighted reel, as described, having a cylindrical winding hub and circular heads at the ends of the hub, said heads having spaced parallel lugs on and radiating from their marginal or peripheral portions at a prescribed location, the inward face of one lug having a socket, there being a spring pressed ball-type detent mounted for operation in said socket, the other lug having a screw-threaded hole in line with the socket, and said screw being screwed into and through the hole from the outward side of the other lug, the inward end of said setscrew having a semi-spherical terminal or teat normally residing in reel closing contact with said detent.

Objects and advantages in addition to those specifically stated will become apparent from the following detailed description, the accompanying drawings and subjoined claims.

In the accompanying sheet of drawings wherein like numerals are employed to designate like parts throughout the views:

Figure 1 is a side elevational view showing a floating decoy-duck, the swivel, the catch joined to the swivel, the line and the improved sinker-type reel.

Figure 2 is a perspective view of the reel by itself with the line completely wound thereon.

Figure 3 is an enlarged section on the vertical line 3—3 of Figure 2 looking in the direction of the arrows.

Figure 4 is a plan view showing the relationship of the ball detent and setscrew.

It is a matter of common knowledge that similarly constructed and performing anchoring weights for floating decoys are not new. These prior art devices vary in form, types and details of construction. In the improved arrangement herein revealed, the decoy-duck, which is conventional, is denoted by the numeral 6. In accordance with the present invention it is provided on its forward ventral portion with a more or less conventional type swivel 8. The mooring line is denoted by the numeral 10 and it is provided on its upper or free end with a safety pin-type catch or fastener 12 which is releasably connectable with the swivel 8. The improved anchor takes the form of what may be described as a weighted reel and this is denoted as a unit by the numeral 12. It is of lead or some similar non-corrodible material. The reel is generally circular in end elevation. It is of one piece from and comprises a cylindrical centrally disposed hub 14 and duplicate spaced parallel essentially circular heads 16 and 18 respectively. The marginal portion or peripheral edges of the heads may be chamfered and curved and bevelled inwardly toward each other, as at 20—20, to facilitate hand winding the line on the hub, as at 22. One end of the line or cord is knotted, as at 24 and anchored in a hole 26 provided therefor, as shown in Figure 3. The latching and releasing means is substantially automatic. It is preferred, in connection with this phase of the invention, to provide lugs 28 and 30, these are integral and are in opposed parallelism. The inner face of lug 28 is provided with an inwardly opening socket 32 in which a coiled spring 34 is seated, said spring having a suitably attached freely rotatable ball-type detent 36 associated therewith. There is a screw-threaded hole 38 in the lug 30 to accommodate a setscrew 40. The outer kerf-equipped end is exposed through this lug so that the setscrew may be loosened or tightened as the occasion demands. The inner terminal or shank portion of the screw is substantially semispherical, as at 42 and has limited frictional pressure contacts with the ball detent. Obviously, when the line is hand wound on the hub between the heads, the free end portion may be forcibly passed between the detent and terminal or nose 42 without hindrance. Also, when the line is tensioned as the reel or weight descends into the water, it is obvious that the convolutions unwind slowly but surely as they are progressively released for passage between the spring pressed ball detent 36 and the terminal 42. It follows that it is an easy matter to wind up the line on the reel and to keep it wound. By the same token, it also unwinds in a desirable manner until the reel rests on the bottom in the manner shown in Figure 1.

While the reel is primarily adapted for use in the capacity shown and described, it is obvious that it could also be employed satisfactorily as a plumb bob and for other similar purposes where sinkers and weights are attached to an end of a flexible line.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. As a new article of manufacture, a decoy-duck mooring device comprising a weighted reel having a hub and heads at the ends of said hub, said heads having spaced parallel lugs on and radiating from their marginal portions, the inward face of one lug having a socket, a spring pressed ball-type detent mounted in said socket, and a setscrew adjustably mounted in the other lug and opposed to and normally contacting said detent.

2. As a new article of manufacture, a decoy-duck mooring device comprising a weighted reel having a hub and heads at the ends of said hub, said heads having spaced parallel lugs on and radiating from their marginal portions, the inward face of one lug having a socket, a spring pressed ball-type detent mounted in said socket, the other lug having a screw-threaded hole in line with said socket, and a setscrew screwed into and through said hole, the inner end of said setscrew having a semi-spherical terminal normally residing in contact with said detent.

References Cited in the file of this patent

UNITED STATES PATENTS

| Number | Name | Date |
| --- | --- | --- |
| 2,589,913 | Wenner | Mar. 18, 1952 |

FOREIGN PATENTS

| Number | Country | Date |
| --- | --- | --- |
| 561,010 | Great Britain | 1944 |